Aug. 27, 1940.  B. DE MATTIA  2,212,494
APPARATUS FOR TREATING PLASTIC MATERIAL
Filed Oct. 9, 1937  5 Sheets-Sheet 2

Fig. 2.

INVENTOR
Barthold De Mattia
BY
Morrison, Kennedy & Campbell
ATTORNEYS

Aug. 27, 1940.   B. DE MATTIA   2,212,494
APPARATUS FOR TREATING PLASTIC MATERIAL
Filed Oct. 9, 1937   5 Sheets-Sheet 3

INVENTOR
Barthold De Mattia
BY
Morrison, Kennedy & Campbell
ATTORNEYS

Patented Aug. 27, 1940

2,212,494

UNITED STATES PATENT OFFICE 2,212,494

APPARATUS FOR TREATING PLASTIC MATERIAL

Barthold De Mattia, Clifton, N. J.

Application October 9, 1937, Serial No. 168,160

5 Claims. (Cl. 18—2)

This invention relates to apparatus for treating plastic materials, such as compounded rubber, wherein the material being processed is passed repeatedly between a pair of spaced rolls until, upon acquiring a certain degree of plasticity, it adheres to and forms itself upon one of the rolls, whereupon it is automatically removed and fed again between the rolls to allow the treating operation to proceed.

In the process of mixing rubber compounds (in which connection the present invention will be described), crude or compounded rubber is fed into the mill, where it is caught in the bite between the front and rear rolls and masticated by the squeeze of the rolls as it passes between them. After a few passes, the rubber becomes sufficiently tacky or plastic to adhere to and form itself upon the front roll in a layer having a thickness determined by the spacing of the rolls, which, in practice, is about three-eighths of an inch, although this dimension is by no means critical. After the roll is entirely coated, there is still an excess of rubber which accumulates in the bite of the rolls and is referred to as "the bank." In order completely to masticate the rubber and mix the ingredients compounded therewith throughout the mass, the layer of rubber is partially cut or scraped from the roll and then permitted to be drawn back again into the bank by the portion left intact on the roll, these operations being repeated over and over again until the batch is of the desired plasticity, mixture and homogeneity.

In order to carry out the aforesaid operations mechanically, it has been proposed heretofore to provide the apparatus with a scraper which descends into contact with the roll near one end thereof and then moves longitudinally along the roll until a predetermined position is reached, whereupon the scraper is raised out of contact therewith, so as to permit the unscraped portion, or that part which still adheres to the roll, to draw the portion that has been scraped from the roll back into the bank. These operations are repeated continuously first from one end of the roll and then from the other until the entire batch is thoroughly mixed. Apparatus of the aforementioned character is described in the Allen Patent No. 1,932,200. According to the Allen disclosure, the scraper is caused to descend into contact with the roll at a position located near but not at the end of the roll, the first movement of the scraper, after being brought in contact with the rubber blanket, being toward the nearer end in order to give opportunity for the scraper to penetrate the rubber coating which blankets the roll. This procedure is necessary, since the head on which the scraper is mounted moves continuously from one end of the roll to the other and rests at the ends only long enough for the motor, which effects the longitudinal movement of the scraper, to be reversed in direction. The scraper is carried by a traveling head actuated through a chain drive from a stationary motor mounted at the end of the machine.

According to the present improvements, the head which carries the scraper is mounted on a carriage on which the motor drive is also mounted, the entire scraper actuating device thus being a self-contained unit mounted entirely within the confines of the side frames of the machine. The driving motor is also of the reversible type, as in the Allen patent, but means are provided for arresting its operation for a predetermined period at the end of each pass of the scraper across the roll, in order to allow a suitable interval for the material which has been stripped from the roll to be drawn again into the bank and a new layer formed on the roll. The present improvements also provide for the scraper to descend into contact with the roll at the extreme end thereof, as well as means for maintaining the scraper at the end of the roll for a predetermined period completely to penetrate the rubber blanket and scrape the roll clean at the starting end, and also to accumulate any desired amount of compounded material before the longitudinal cutting stroke of the scraper is inaugurated.

Referring to the drawings.

Figure 1:
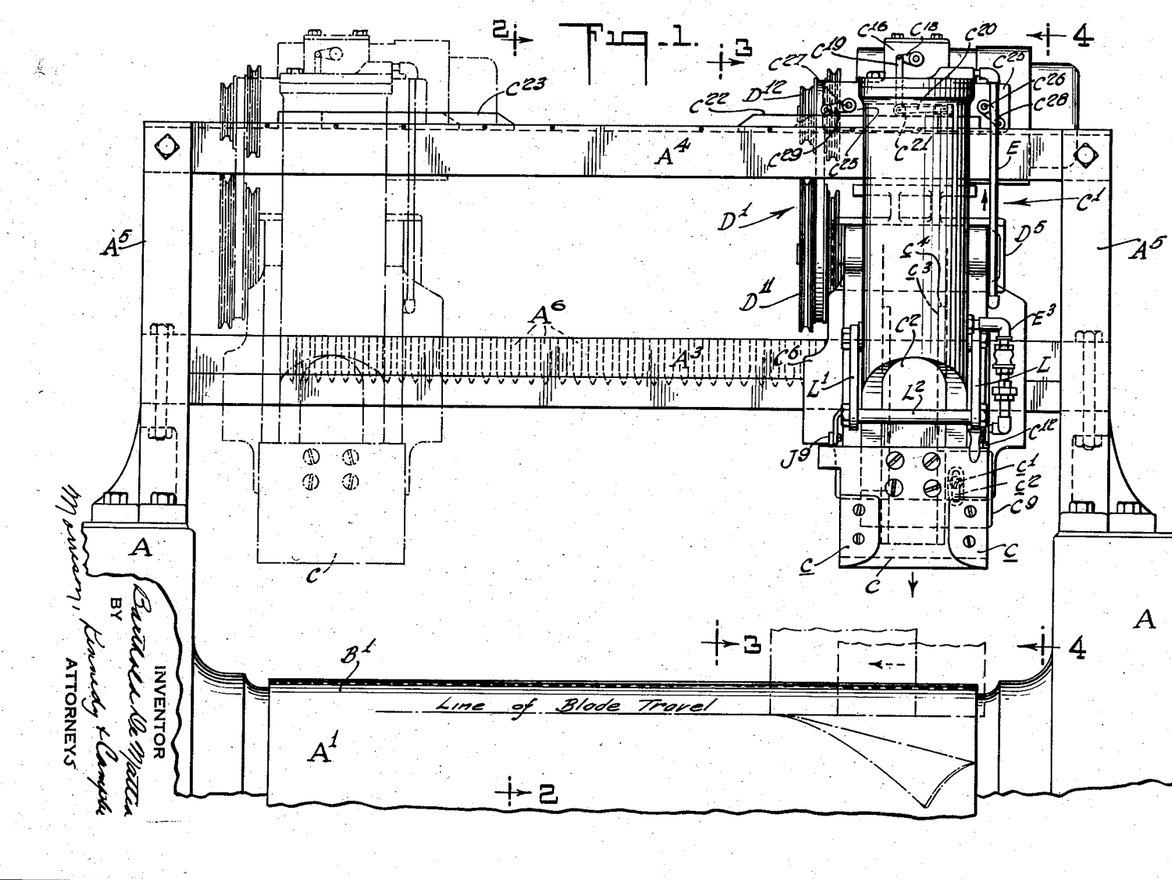
Fig. 1 is a front elevation of a mixing mill equipped with the present improvements.
Figure 2:
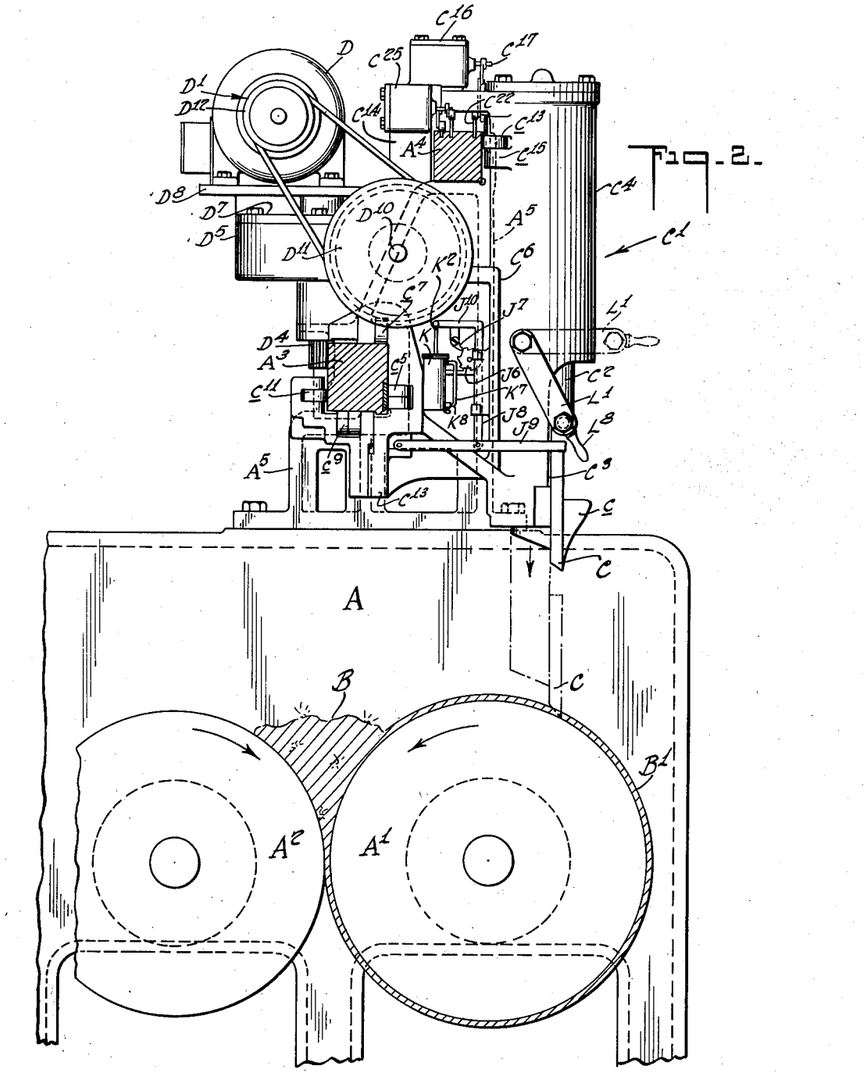
Fig. 2 is a vertical sectional view on line 2—2 of Fig. 1.

Referring to Figs. 1 and 2 of the drawings, there is shown a rubber mixing mill comprising end frames A, in which are journalled a pair of laterally disposed horizontal rolls $A^1$ and $A^2$ geared together and driven in opposite directions by suitable driving means (not shown). The rubber B to be treated is deposited between the rolls, so as to be drawn down between them and, after a few passes between the rolls, a tacky condition results, which causes a blanket $B^1$ to form on one of the rolls, in this case, the front one. Obviously, if the layer of rubber were not removed from the roll, it would continue to adhere thereto and pass continuously between the rolls, while the excess or bank B would remain at the top, with little or no mixing.

According to the present invention, the layer of rubber $B^1$ is scraped from the roll and returned to the bank automatically, the mechanism for this purpose including a scraper blade or knife C (see Fig. 1) which is arranged to descend into contact with the front roll $A^1$ at one end thereof, and thereafter moved longitudinally of the roll. The movement of the scraper blade is diagrammatically illustrated in Fig. 8, the normal position of the blade being shown in solid lines. After the blade C has descended along the line $a$ into contact with the roll, it remains there for a suitable period to give the scraper blade opportunity to cut into the rubber coating $B^1$ and engage directly against the roll surface. Thereupon, automatic means are rendered operative to move the knife longitudinally of the roll (its path being indicated by the line $a^1$) until it reaches a predetermined position $a^2$ spaced somewhat from the left end of the roll, whereupon the scraper blade is raised out of contact with the roll, while its longitudinal movement continues until it reaches the end of its travel, as indicated by the dotted line position in the figure. Since the contact of the blade with the roll ceases before the end of the roll has been reached, there will be a portion of the rubber covering at this end, which extends continuously around at the roll, and this portion will pull the part that has been scraped from the roll back into the bank for further mastication. The blade C remains in this position for a suitable period, which is determined in a manner hereinafter described, whereupon the blade again descends along the line $a^3$ into contact with the roll, but this time at the left end thereof. Again the blade is maintained in this position for a suitable period for the reasons hereinbefore stated, whereupon it is again moved longitudinally of the roll (its path being indicated by the line $a^4$), but this time in the reverse direction and, before it has traversed the entire distance to the end of the roll from which it started, i. e., when it has reached the position $a^5$, it is again raised out of contact with the roll and returned to its initial position. The delay period, that is the time during which the blade is at the end of and out of contact with the roll will have been sufficient to allow the rubber coating again to form entirely around the roll, so that there will now be a portion at the original end thereof which extends completely around it, and which in turn will act to draw the portion of the rubber coating that has been scraped from the roll during the return movement of the blade back into the bank. These operations are repeated continuously until the rubber has received the desired treatment.

Figure 3:
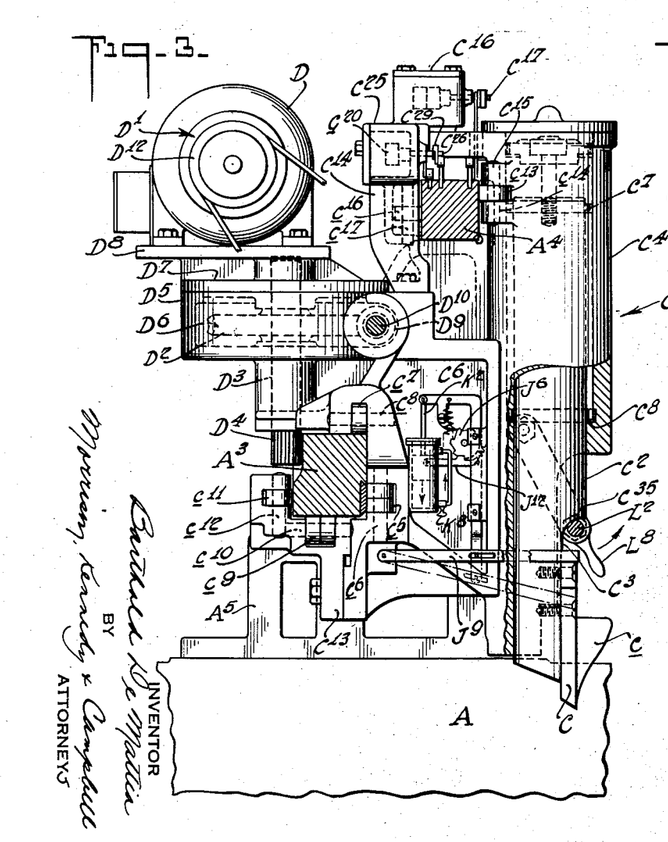
Fig. 3 is a vertical sectional view on line 3—3 of Fig. 1.
Figure 4:
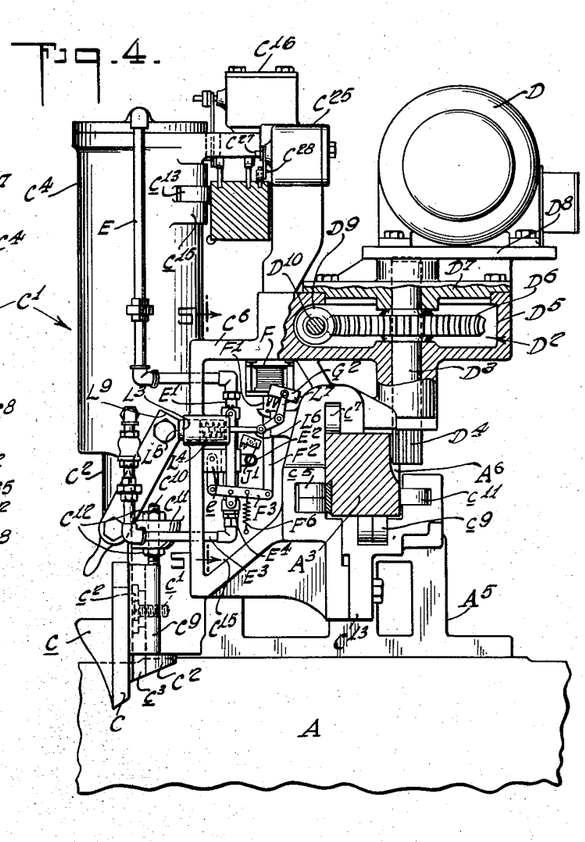
Fig. 4 is a vertical sectional view on line 4—4 of Fig. 1.

The scraper blade C (see Figs. 1 and 3) is actuated into and out of engagement with the roll through the medium of an air-operated piston and cylinder arrangement $C^1$, the blade for this purpose being screwed at the lower end of a cylindrical piston $C^2$ which is cut away, as at $C^3$ for the purpose, and which is arranged to reciprocate in a cylinder $C^4$ formed as part of a large casting $C^6$ mounted and arranged for longitudinal movement along a pair of spaced horizontal cross members or rails $A^3$, $A^4$ supported at their ends in a pair of upright frame members $A^5$ mounted at the top of the supporting frames A in which the rolls $A^1$, $A^2$ are journalled. As shown in Fig. 3, the diameter of the piston $C^2$ is somewhat smaller than the internal diameter of the cylinder $C^4$ and, at the top of the piston, there is mounted a packing member or washer $C^7$ engaging the internal cylindrical wall of the cylinder. A similar packing member $C^8$ is fixed in the cylinder at its lower end and which engages tightly against the outer cylindrical surface of the piston. The arrangement is such that, as air is introduced into the cylinder above the piston, the latter will descend to effect the engagement of the scraping blade C with the roll $A^1$ and, as air is introduced into the lower portion of the cylinder below the packing member $C^7$, the piston will be raised to withdraw the scraper blade out of engagement with the roll. Of course, while the piston is descending, provision is made for allowing the air to escape from the cylinder beneath the packing member $C^7$; whereas, when the piston is ascending, similar provision is made for permitting the air to escape from the cylinder above the piston $C^2$. The packing member $C^8$ maintains the cylinder air tight at its lower end.

As shown in Figs. 1 to 4, the blade C is formed at the front and at its lateral edges with a pair of outwardly and upwardly curved surfaces $c$, which act in the manner of plows, as the blade is moved longitudinally along the roll $A^1$ to insure that the material will be moved forwardly away from the roll. Provision is also made for adjusting the clearance or tolerance between the scraper blade and the roll, when the blade is in its lowermost position. The means for this purpose includes a shoe $C^9$ (see Figs. 1 and 4) fastened by means of a screw and slot connection $c^1$, $c^2$ to the cylinder $C^4$ near the lower end thereof. This shoe has a feather portion extending into a vertical keyway or slot $c^3$ formed in the piston and which, at its upper end, presents a shoulder $c^4$ adapted to bank against the shoe $C^9$ as the piston descends. Thus, the position of the shoe will determine the lowermost position to which the piston may descend. The shoe $C^9$ may be adjusted to its proper position by removing the scraper blade from the piston, loosening the screw $c^1$ and adjusting a screw $C^{10}$ (see Fig. 4) threaded through a lug $C^{11}$ formed on the outer wall of the cylinder, and which banks against the upper edge of the shoe. The adjustment of the screw is maintained by a pair of lock nuts $C^{12}$ engaging the lug, one above and the other below, while the position of the shoe $C^9$ against the banking screw is maintained by tightening the screw $c^1$ previously alluded to.

As previously stated, the casting $C^6$ of which the air cylinder $C^4$ forms a part, is mounted on the horizontal rails $A^3$, $A^4$, and the longitudinal movement of the scraper C with respect to the roll $A^1$ is effected by causing this casting, which in effect is a carriage, to move longitudinally along these horizontal rails. For this purpose, the casting or carriage $C^6$ is equipped with two pairs of horizontally spaced rollers $c^5$ arranged on vertical shafts $c^6$ journalled in the casting, and which bear against the lower horizontal rail $A^3$ at the front, and also with two horizontally spaced rollers $c^7$ arranged on horizontal fore-and-aft shafts $c^8$ journalled in the casting, and which bear against the horizontal rail $A^3$ at the top. In another casting $C^{13}$ screwed to the main casting at the bottom, there are mounted two pairs of horizontally spaced rollers $c^9$ on horizontal fore-and-aft shafts $c^{10}$, and which bear against the horizontal frame member $A^3$ at the bottom, and two similarly spaced rollers $c^{11}$ on vertical shafts $c^{12}$ journalled in said casting and which bear against said frame member at the rear (see Figs. 3 and 4), so that there is anti-friction contact between the carriage and the frame member at all faces of the latter. The carriage is also guided at the top by the horizontal frame member $A^4$, there being provided for this purpose two anti-friction rollers $c^{13}$ mounted on vertical shafts $c^{14}$ journalled in lugs $c^{15}$ formed on the air cylinder and which bear against the frame member $A^4$ at the front, and a single anti-friction roller $c^{16}$ mounted on a vertical shaft $c^{17}$ journalled in another casting $C^{14}$ secured to the main casting at the top, and which bears against the frame member $A^4$ at the rear.

The carriage $C^6$ is self-propelled through the medium of a motor D mounted on the carriage and which, through a belt drive $D^1$ and a worm and wheel $D^2$, rotates a vertical shaft $D^3$ (see Fig. 4) formed at its lower end, with a pinion $D^4$ arranged to cooperate with a series of rack teeth $A^6$ formed in the rear face of the horizontal frame member $A^3$ along substantially its entire length. The worm and wheel are arranged in a housing $D^5$ formed in the main casting, the wheel $D^6$ being fixed on the vertical shaft $D^3$, which is journalled at the bottom in the casting and at the top in another casting $D^7$ which forms a cover plate for the housing and which also carries a platform $D^8$ on which the motor D is mounted. The worm $D^9$ is formed on a horizontal shaft $D^{10}$ likewise journalled in the main casting, and provided at its left end (see Fig. 1) with a three step pulley $D^{11}$ to which the power of the motor is transmitted. The motor is also equipped with a three step pulley $D^{12}$, the arrangement thus providing for three different speeds of travel of the carriage, the motor being of the constant speed type.

Figure 5:
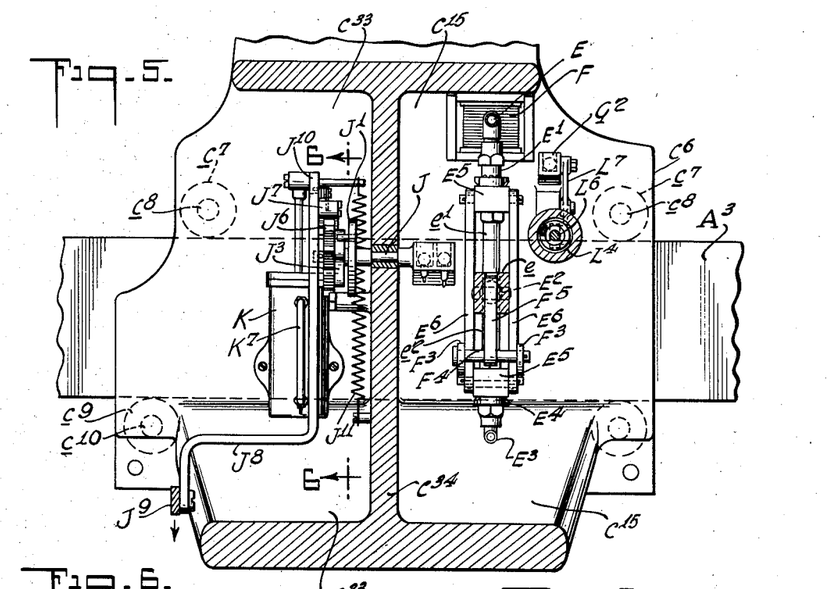
Fig. 5 is an enlarged sectional view on line 5—5 of Fig. 4.

Air is supplied to the cylinder at the top (see Fig. 4) to cause the downward stroke of the piston through an air line E, connected through a valve $E^1$ with an air supply line $E^2$ and to the cylinder at the bottom for raising the piston through a similar air line $E^3$ and valve $E^4$ connected to the same air supply line $E^2$. The air supply line $E^2$ is tapped into a fixed block $e$ as are also a pair of nipples $e^1$, $e^2$, leading to the respective valves $E^1$ and $E^4$. The valve mechanism is located in a recess $C^{15}$ formed in the main casting, just rearwardly of and at the right of the air cylinder. As shown in Fig. 5, these valves are of a standard type and are equipped each with a sleeve $E^5$ movable to two positions, one, an open position, wherein the associated air line will be connected with the air supply line for supplying air to the cylinder, and the other, wherein said air line to the cylinder will be closed. In this latter or closed position of the sleeve, the valve will act to vent the respective end of the cylinder with which it is associated to the atmosphere.

As shown in Fig. 5, the sleeves associated with both valves are yoked together by a pair of bars $E^6$, so that the sleeves will move in unison, the arrangement being such that, when the upper valve is in a condition to connect the upper end of the cylinder with the air supply line $E^2$, the lower valve will be in condition to vent the lower end of the cylinder to the atmosphere; and similarly, when the lower valve is in a condition to connect the lower end of the cylinder with the air supply line, the upper valve will be in a condition to vent the upper end of the cylinder to the atmosphere. These valves are operated from a solenoid F (see Fig. 4) having an armature $F^1$ connected by means of a link $F^2$ at the rear end of a pair of substantially horizontal bars $F^3$ pivotally connected near their centers to the bars $E^6$ yoking the valves $E^1$ and $E^4$ together. At their front ends, (Fig. 5) the bars $F^3$ are connected together by a pin $F^4$ which passes through a vertical bar $F^5$ pivotally connected at its upper end to the fixed block $e$. The arrangement is such that, as the solenoid F is energized, the armature will be raised against the tension of a spring $F^6$, fastened to the bars $F^3$ and having a fixed anchorage, to lift the bars $E^6$, thereby connecting the air supply line $E^2$ with the upper end of the air cylinder and venting the lower end of the air cylinder to the atmosphere, with the result that the piston $C^2$ will descend to bring the scraper bade into engagement with the mill roll $A^1$. When the solenoid is deenergized, the armature thereof will be allowed to drop, with the result that the bars $F^3$, under the action of the spring $F^6$ will actuate the valves in a manner to connect the lower end of the air cylinder with the air supply line $E^2$ and vent the upper end of the cylinder to the atmosphere, with the result that the piston $C^2$ will ascend to raise the scraper blade out of engagement with the roll $A^1$.

As best shown in the circuit diagram (see Fig. 9), the solenoid F is included in a circuit, which can be traced from the main line G, through a lead $G^1$, a main switch $G^2$, the solenoid F, and back to the main line $G^3$ through a lead $G^4$, and two paths in parallel, one including a lead $G^5$, a tiltable mercury switch $G^6$, and a lead $G^7$, and the other including a switch (not shown) in a timing device $G^8$ and a lead $G^9$. The timing device itself is connected to the main line through a circuit which includes the lead $G^{10}$, the timing device, a lead $G^{11}$, and a tiltable mercury switch $G^{12}$. The timing device arrangement is such that, when the mercury switch $G^{12}$ is tilted to make an electrical connection therethrough, the timing device will start to operate and, after a predetermined interval as determined by the setting of said device, will operate the switch therein to make an electrical connection through the solenoid. When the switch $G^{12}$ is tilted in the opposite direction, the circuit therethrough is broken, as is also the circuit through the solenoid that is controlled by the timing device. The mercury switches $G^6$ and $G^{12}$ are mounted in a casing $C^{16}$ formed at the top of the casting $C^{14}$ and on a common shaft $C^{17}$ journalled in a front wall of the casing. On the shaft $C^{17}$ at its front end, there is pinned an arm $C^{18}$ (see Fig. 1) connected by means of a link $C^{19}$ to an arm $C^{20}$, the latter being pivoted to the link $C^{19}$ as well as to the casting $C^{14}$. At the pivot point between the link $C^{19}$ and the arm $C^{20}$, there is provided an anti-friction roller $C^{21}$, adapted to engage the upper edge of one or another of a pair of alined bars $C^{22}$ and $C^{23}$ arranged in the opposite ends of a slot $C^{24}$ formed in the top of the guide rail $A^4$. According to this arrangement, when the carriage is in a position wherein the anti-friction roller $C^{21}$ engages the upper edge of either one of said bars $C^{22}$, $C^{23}$, the mercury switches $G^6$, $G^{12}$ will be tilted in one direction; whereas, when the carriage is in a position wherein the anti-friction roller rests upon the upper rail $A^4$ at some position between the inner ends of said bars, the mercury switches will be tilted in the opposite direction. It will be understood, of course that these mercury switches are so designed that, when they are tilted in one direction, the circuit therethrough will be broken; whereas, when they are tilted in the opposite direction, the circuit therethrough will be closed. Furthermore, the two mercury switches $G^6$, $G^{12}$ are so arranged that, when the circuit through one is closed, the circuit through the other is opened, and vice versa.

Figures 8, 9:
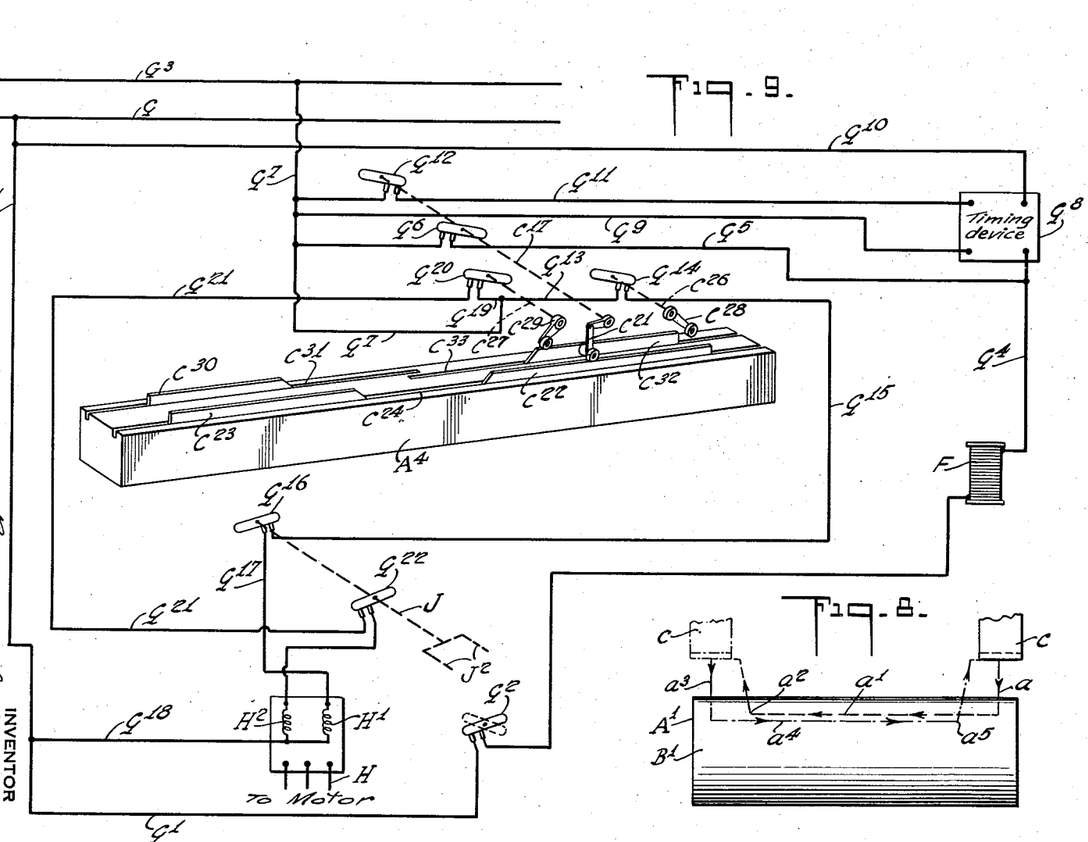
Fig. 8 is a diagrammatic illustration of the path followed by the scraper in its travel from one end of the roll to the other and return.
Fig. 9 is a perspective view of the circuit controlling apparatus, as well as a diagrammatic view of the control circuit arrangement.

The motor D which effects the longitudinal movement of the carriage along the guide rails $A^3$ and $A^4$ is of the reversible type and, in the present instance, is shown diagrammatically as being connected to a three phase circuit H (see Fig. 9). The three phase circuit to the motor is controlled by a pair of relays $H^1$ and $H^2$, the arrangement being such that, when one relay is energized, the motor will operate in one direction; whereas, when the other relay is energized, the motor will be operated in the reverse direction. Each relay is controlled through a pair of tiltable mercury switches in series, the circuit through the relay $H^1$ being traceable from the main line $G^3$ through leads $G^7$ and $G^{13}$, a mercury switch $G^{14}$, a lead $G^{15}$, a mercury switch $G^{16}$, a lead $G^{17}$, the relay $H^1$, and through a common lead $G^{18}$ back to the main line G. The circuit through the relay $H^2$ can be traced through leads $G^7$ and $G^{19}$, a mercury switch $G^{20}$, a lead $G^{21}$, a mercury switch $G^{22}$, the relay $H^2$, and through the common lead $G^{18}$ back to the main line G. The mercury switches $G^{14}$ and $G^{20}$ are mounted (see Fig. 1) in horizontally spaced casings or compartments $C^{25}$ in the casting $C^{14}$ just below the compartment $C^{16}$ in which the switches which control the solenoid are mounted. The switches $G^{14}$, $G^{20}$ are fixed each to a rotatable shaft $C^{26}$, $C^{27}$ journalled in the walls of their respective casings, the shafts being provided each with an arm $C^{28}$, $C^{29}$ having an anti-friction roller at its lower end. The arm $C^{28}$ associated with the switch $G^{14}$ at the right is adapted to cooperate with a bar $C^{30}$ arranged in a slot $C^{31}$ (Fig. 9) in the top of the upper horizontal rail $A^4$ at the left end thereof; whereas the arm $C^{29}$ associated with the switch $G^{20}$ at the left is adapted to cooperate with a bar $C^{32}$, mounted in a similar slot $C^{33}$ at the right end of the rail. These slots $C^{31}$, $C^{33}$, and consequently the bars $C^{30}$, $C^{32}$, are offset, so that the bar $C^{30}$ at the left will not interfere with the arm $C^{29}$ associated with the left hand switch when the carriage is in its leftmost position, and so that the bar $C^{32}$ at the right will not interfere with the arm $C^{28}$ associated with the right hand switch when the carriage is in its rightmost position. Here, again, the arrangement is such that, when the anti-friction rollers associated with the arms $C^{28}$, $C^{29}$ engage the top surface proper of the rail $A^4$, the mercury switches $G^{14}$, $G^{20}$ will be in one condition, as for instance, circuit closing condition; whereas, when said anti-friction rollers engage the upper edges of their respective bars $C^{30}$, $C^{32}$, the switches will be tilted in the opposite direction, wherein the circuits therethrough will be open.

The two other mercury switches $G^{16}$, $G^{22}$ are mounted on a common shaft J, (see Figs. 5 and 9) so that they can be tilted each from a position wherein the circuit therethrough is opened to a position wherein the circuit therethrough is closed, and, here again, the arrangement of these two switches is such that, when the circuit through one switch is made, the circuit through the other switch is broken and vice versa.

The mercury switches $G^{16}$, $G^{22}$ are tilted from one position to the other under the control of the scraper blade C, i. e., when the blade descends into engagement with the roll $A^1$ at one end thereof, the mercury switches will be tilted in one direction, whereas, when the piston descends into engagement with the roll at the opposite end thereof, the mercury switches will be tilted in the opposite direction. The mechanism for operating these mercury switches is located in a compartment $C^{33}$ in the main casting and at the rear of the air cylinder and is separated from the compartment $C^{15}$ which houses the air valves and the solenoid by a web member $C^{34}$ (see Fig. 5). The shaft J on which the mercury switches $G^{16}$, $G^{22}$ are mounted is journalled in this web section and, on said shaft, at the side of the web section opposite the mercury switches, there is fixed a cross bar $J^1$ provided with a pair of spaced pins $J^2$ adapted to cooperate with a cam member or star wheel $J^3$ having four high portions $J^4$ and four intermediate low portions $J^5$ (see Fig. 7). Formed integrally with the star wheel (see Fig. 6) is an eight-toothed ratchet wheel $J^6$, the two comprising a unit, rotatably mounted on the shaft J. The ratchet wheel $J^6$ is rotated through the medium of a spring-pressed pawl $J^7$ pivotally mounted on a bar $J^8$ arranged for vertical movement in guide brackets fixed in the casting (see Fig. 3). The bar $J^8$, near its lower end, is offset to the left (see Fig. 5) and is connected by means of a pin and slot connection at the center of a lever $J^9$ pivotally mounted at its rear end on the casting $C^6$ and having its front end overlying the upper edge of the scraper blade C. At its top (see Figs. 5 and 6), the bar $J^8$ is provided with a rearwardly extending arm $J^{10}$, to which there is connected a spring $J^{11}$, having an anchorage at its lower end in the casting and which tends to urge the bar $J^8$ downwardly. According to this arrangement, when the scraper blade C descends, the lever $J^9$ is freed, whereupon the bar $J^8$ will move downwardly under the action of its associated spring $J^{11}$ and, in so doing, will cause the pawl $J^7$ to rotate the ratchet wheel $J^6$, and consequently the star wheel $J^3$, through an angle of 45°. Assuming that the star wheel $J^3$ is in the position shown in solid lines in Fig. 7, the pins $J^2$ on the bar $J^1$ fixed to the shaft J will rest one on a high portion and the other on a low portion thereof. As the star wheel moves through the angle of 45° to the position shown in dotted lines in Fig. 7, the positions of the pins $J^2$ will be reversed, that is, the one previously occupying a high portion of the star wheel will now occupy a low portion thereof, whereas that previously occupying a low portion of the star wheel will now occupy a high portion thereof. In other words, the bar $J^1$ will be swung from the solid line position shown in Fig. 7 to the dotted line position shown therein and, in so doing, will tilt the switches from one angular position to another.

As the scraper blade ascends, it will restore the lever $J^9$, and consequently the bar $J^8$, to their normal positions, this movement being against the action of the springs $J^{11}$. This movement of the bar $J^8$ however, will be an idle one, insofar as the star wheel $J^3$ is concerned, retrograde movement of the latter being prevented by an additional spring-pressed pawl $J^{12}$ cooperating with the ratchet wheel $J^6$. When the scraper blade again descends at the other end of the roll, the star wheel will be similarly rotated through another angle of 45°, or back to the solid line position shown in Fig. 7, in which case the mercury switches will be tilted in the opposite direction back to their original positions.

Figure 6:
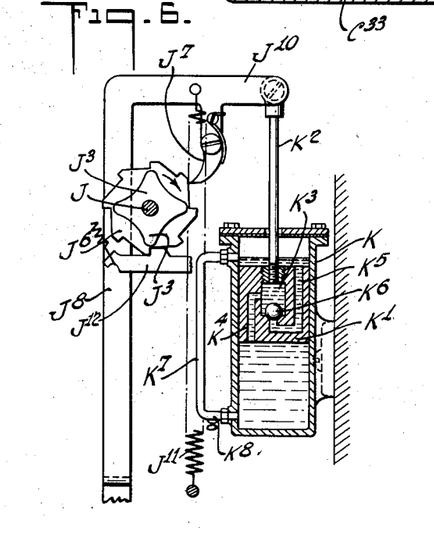
Fig. 6 is a vertical sectional view of the mechanism for delaying the scraper a predetermined period at the beginning of each scraping stroke.
Figure 7:
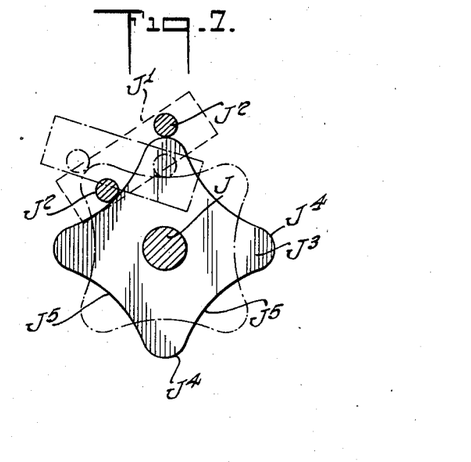
Fig. 7 is an enlarged elevation of a portion of the mechanism shown in Fig. 6.

It will be recalled now that after the scraper blade C descends into contact with the roll $A^1$, there is a delay period before the motor D is energized, in order to give time for the knife to cut through the rubber coating $B^1$ and accumulate the desired amount of compounded material before the blade is moved longitudinally of the roll. This delay period is effected by retarding the descent of the bar $J^8$ which actuates the star wheel $J^3$. The mechanism for this purpose is shown in Fig. 6, and includes a cylinder K with a piston $K^1$ arranged to reciprocate therein, the piston being connected by a rod $K^2$ with the upper horizontal portion $J^{10}$ of the bar $J^8$. The piston is formed with a hollow central portion $K^3$ and a duct $K^4$ communicating at one end with said hollow central portion and at its other end with the cylinder K below the piston. The piston is also formed with another duct $K^5$ communicating at one end with said central hollow portion of the piston and at its other end with the cylinder above the piston. Where this second duct $K^5$ enters the central hollow portion $K^3$ of the piston there is provided a ball valve $K^6$ which is normally closed when the parts are at rest. The cylinder is filled with a suitable liquid, as for instance, glycerine, and the portions of the cylinder above and below the piston are connected by a by-pass $K^7$ in which there is a regulating valve $K^8$ to control the flow of liquid therethrough.

According to this arrangement, when the scraper blade C descends from its upper position to its lower position in contact with the roll $A^1$, the descent of the bar $J^8$, under the action of its associated spring $J^{11}$, will be delayed, since the valve $K^6$ in the piston will be closed under the action of the glycerine which consequently will be forced to pass from the lower side of the piston to the upper side thereof through the by-pass $K^7$ and the regulating valve $K^8$. This delay in the descent of the bar $J^8$ will cause a corresponding delay in the rocking of the shaft J which tilts the mercury switches to cut in the motor D and by suitably adjusting the setting of the regulating valve $K^8$, the scraper blade can be caused to dwell in contact with the roll any desired period before its longitudinal movement is inaugurated. As previously stated, the return or upward movement of the bar $J^8$ is effected positively by the upward movement of the scraper blade C. Its stroke will not be retarded, since, as the piston $K^1$ moves upwardly, the glycerine or liquid will readily pass from the upper side of the piston to the lower side through the ducts $K^5$, $K^4$, and the ball valve $K^6$, which, under these circumstances, will be unseated by the action of the liquid.

With the foregoing description in mind, it is thought that the operation of the device can be readily understood by referring to the circuit diagram illustrated in Fig. 9. But, first, it might be stated that, when the machine is at rest and the air turned off, the scraper blade C is held upwardly out of contact with the roll $A^1$ by a safety device (see Figs. 1, 2, 3 and 4), which includes a pair of arms L, $L^1$ pivoted one at each side of the air cylinder $C^4$ and a cross bar $L^2$ connecting the arms and which engages beneath a curved shoulder $C^{35}$ presented at the upper end of the cut-away portion $C^3$ in the piston $C^2$. Inadvertent movement of the safety device is prevented by a spring-pressed plunger $L^3$ mounted in a cylindrical recess $L^4$ formed in the casting $C^6$ and which banks against a flattened surface $L^5$ presented at the upper end of one of the arms (see Fig. 4). The plunger $L^3$ is formed with a stem $L^6$ extending through the rear wall of the recess and which at its rear end is connected to one arm of an angularly-shaped lever $L^7$ pivotally mounted on the casting $C^6$. On the other arm of the lever, there is mounted the tiltable mercury switch $G^2$, which, as shown in Fig. 9, controls the opening and closing of the circuit through the solenoid F. When the safety device is in its active position, wherein the descent of the scraper blade is prevented, the mercury switch $G^2$ is in its opened condition.

Assume now that the carriage is in its rightmost position and that the air supply is shut off, so that the piston for actuating the scraper blade is in a position wherein it is supported by the cross bar $L^2$ of the safety device. Under these circumstances, as shown in Fig. 9, the roller $C^{21}$ which controls the position of the switches $G^{12}$ and $G^6$ will rest on the upper edge of the bar $C^{22}$, so that the switch $G^{12}$ controlling the operation of the timing device $G^8$ will be closed, while the switch $G^6$ controlling the alternate circuit through the solenoid F will be opened, as will also the main switch $G^2$. Both circuits which control the operation of the motor D, under these conditions, will be open, the one through the relay $H^1$ by virtue of the fact that the switch $G^{16}$ in such circuit, controlled by the descent of the scraper blade, is open, although the switch $G^{14}$ in series therewith is closed. The other circuit through the relay $H^2$ will be open by virtue of the fact that the switch $G^{20}$, in such circuit, namely, that controlled by the bar $C^{32}$ on the guide rail $A^4$ is open, although the switch $G^{22}$ in series therewith and which is controlled by the descent of the scraper blade is closed.

In order to start the machine, the operator first turns on the air pressure and, since, under the conditions stated, the lower air valve $E^4$ will be in a condition to admit air into the lower part of the cylinder, the piston $C^2$ will be raised slightly to its uppermost position, clear of the bar $L^2$ of the safety device. The operator then swings the safety device from the solid line position shown in Fig. 2 to the dotted line position shown therein, the safety device being provided with a handle $L^8$ for this purpose. This movement of the safety device will press the spring-pressed plunger $L^3$ rearwardly, and cause it to engage a different flat surface $L^9$ on the safety device, to hold the latter in its inoperative position. This rearward movement of the spring-pressed plunger will also rock the mercury switch $G^2$ to the solid line position shown in Fig. 9. Recalling now that the circuit through the timing device is active, the closing of the main switch $G^2$ will complete the circuit through the solenoid F and, as the solenoid is energized, the air valves $E^1$ and $E^4$ will be operated in the manner previously described to effect the descent of the scraper blade C. After a suitable time interval, allowing for the scraper blade to dwell in contact with the roll A¹ at the left end thereof and, as determined by the delay device, previously referred to, the mercury switches G¹⁶ and G²² will be tilted to their alternate position, wherein the switch G²² will be opened and switch G¹⁶ closed. Since, as previously stated, the switch G¹⁴ in series with the switch G¹⁶ was previously closed, a circuit will be established through the relay H¹, which will operate to connect the motor D for operation in a direction to move the carriage toward the left, thus causing the scraper blade to travel longitudinally of the roll A¹. As the carriage moves to the left, the roller on the arm C²⁹ will leave the bar C³², thereby tilting the mercury switch G²⁰ to its closed position, but this will have no effect upon the operation of the motor, since it will be recalled that the mercury switch G²² in series therewith was opened when the scraper blade descended. Shortly thereafter, the roller C²¹ determining the position of the mercury switch G¹² in the timing circuit and the mercury switch G⁶ in the solenoid circuit will pass off the bar C²². When this occurs, the switch G¹² will be opened, but, as the mercury switch G⁶ is closed, the circuit conditions through the solenoid will remain as before, that is, the solenoid will remain in its energized condition.

The motor D continues to drive the carriage to the left with the scraper blade in contact with the roll A¹ until the blade reaches the position $a^2$ (Fig. 8), at which point in the travel of the carriage, the roller C²¹ rides up upon the bar C²³ at the left, thus causing the mercury switches associated therewith to be tilted back to their original position, wherein the switch G⁶ in the solenoid circuit is opened and the switch G¹² in the timing circuit closed. The timing device now starts to operate and at a later period will again operate the solenoid, but at this instant the solenoid circuit is opened, and the solenoid consequently deenergized. As the solenoid F is deenergized the air valves E¹, E⁴ (see Fig. 4) are actuated to a position, wherein air will flow into the lower end of the air cylinder C⁴ and be vented from the top end thereof, with the result that the scraper blade C is raised to its uppermost position. The motor continues to drive the carriage toward the left until it reaches its leftmost position, whereupon the arm C²⁸ will cooperate with the bar C³⁰ at the left, thus tilting the mercury switch G¹⁴ to its open position and breaking the circuit through the relay H¹. This stops the motor and brings the carriage to rest in its leftmost position, as shown in dotted lines in Fig. 1. Incidentally, it might be stated at this point that the motor D is equipped with a breaking device, which will arrest its operation, immediately the power is turned off.

It will be recalled that the timing device G⁸ started to operate when the mercury switch G¹² was tilted as the roller C²¹ passed up onto the control bar C²³ at the left. This timing device is so adjusted that it will allow the scraper blade to remain in its raised position at the left of the machine a suitable time to permit the portion of the rubber sheet B¹ which was left intact to draw that portion which was scraped off back into the bank between the rolls and to permit a new blanket to form on the roll. When the allotted time has expired, the timing device will again establish a circuit through the solenoid F. As the solenoid is energized, the scraper is again caused to descend in the manner previously described and, after the delay caused by the delay device K, the mercury switches G¹⁶, G²² operated thereby will be tilted to their alternative position. Since the mercury switch G²⁰ was previously closed when its associated arm left the control bar C³², the tilting of the switch G²² by the delay device will now establish a circuit through the relay H², thus causing the motor D to be operated in the reverse direction to move the scraper blade longitudinally of the roll toward the right. The sequence of operations are now the same as before. The arm C²⁸ leaves the control bar C³⁰ at the left, closing the mercury switch G¹⁴, but having no effect upon the circuit through the relay H¹, since the mercury switch G¹⁶ in series therewith is open at this time. A little further on in the carriage travel, the roller C²¹ rides off its control bar C²³ at the left, breaking the solenoid circuit through the timing device, but establishing it simultaneously therewith through the mercury switch G⁶, so that it continues in its energized condition. When the scraper blade reaches the point $a^5$ (see Fig. 8), the roller C²¹ travels up onto the control bar C²² at the right to start the timing device and deenergize the solenoid circuit, which thereupon causes the scraper blade to ascend in the manner hereinbefore described. As the carriage reaches the end of its travel, the arm C²⁹ associated with the mercury switch G²⁰ is actuated by the control bar C³² at the right, tilting said switch to open position and breaking the circuit through the relay H², so as to arrest the carriage in its original position. This cycle of operation is continued automatically until the mixing operation is completed.

At this point, it might be stated that bars C²², C²³, C³⁰ and C³² are bevelled at their inner ends in order to allow the rollers which cooperate therewith readily to ride up onto the upper edges of said bars. Furthermore, these bars are adjustable longitudinally in their respective slots in the event it is desired to alter the time of occurrence in the cycle of the events controlled thereby.

While in the preferred embodiment, the various circuit making and breaking devices have been illustrated as tiltable mercury switches, it will be understood, of course, that a different type of switch could be employed if desired. Indeed, under certain conditions, as for instance, where there is excessive building vibration, a different type of switch might be dictated.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Having thus described my invention what I claim is:

1. A control system for a plastic material treating mill having a pair of driven mill rolls, a scraper adapted to remove material from one of said rolls, a carriage on which the scraper is mounted, a carriage supporting frame, means for moving the scraper into and out of engagement with the roll, and means including a reversible electric motor for moving the carriage back and forth longitudinally of the roll to effect a corresponding movement of the scraper, said control system including a pair of circuits in parallel, one controlling the operation of the motor in one direction and the other the operation of the motor in the reverse direction, and each circuit including a pair of circuit closing devices in series, one circuit closing device in each circuit being operated by the movement of the scraper into engagement with the roll, and the other circuit closing device being operated by devices on the frame and depending upon the position of the carriage, the arrangement of the circuits and the circuit closing devices therein being such that one circuit is closed under the control of the scraper as the latter is moved into engagement with the roll at one end thereof to actuate the carriage in one direction and opened when the carriage approaches the other end of the roll, and the other circuit closed under the control of the scraper as the latter is moved into engagement with the roll at the latter end thereof to actuate the carriage in the reverse direction and opened when the carriage approaches the end of the roll from whence it started.

2. A control system for a plastic material treating mill having a pair of driven mill rolls, a scraper adapted to remove material from one of said rolls, a carriage on which the scraper is mounted, a carriage supporting frame, means for moving the scraper into and out of engagement with the roll, and means including a reversible electric motor for moving the carriage back and forth longitudinally of the roll to effect a corresponding movement of the scraper, said control system including a solenoid circuit operable to control the operation of the scraper moving means in a manner to effect movement of the scraper into engagement with the roll when the carriage is at opposite ends thereof, and out of engagement with the roll when the carriage is at predetermined intermediate position, a pair of circuits in parallel, one controlling the operation of the motor in one direction, and the other the operation of the motor in the reverse direction, and each circuit including a pair of circuit closing devices in series, one circuit closing device in each circuit being operated by the movement of the scraper into engagement with the roll, and the other circuit closing device being operated by devices on the frame and depending upon the position of the carriage, the arrangement of the circuits and the circuit closing devices therein being such that one circuit is closed under the control of the scraper as the latter is moved into engagement with the roll at one end thereof to actuate the carriage in one direction and opened when the carriage approaches the other end of the roll, and the other circuit closed under the control of the scraper as the latter is moved into engagement with the roll at the latter end thereof to actuate the carriage in the reverse direction and opened when the carriage approaches the end of the roll from whence it started.

3. A control system according to claim 1, wherein the circuit closing devices referred to are mercury switches tiltable to opened and closed positions.

4. A mill for treating plastic material including, in combination, a pair of driven mill rolls, a scraper adapted to remove material from one of said rolls and being movable back and forth longitudinally of said roll and into and out of engagement therewith, a movable carriage on which the scraper is mounted, means for moving said carriage to effect the longitudinal movement of the scraper, means for moving the scraper into and out of engagement with the roll, circuit means including a solenoid for controlling the operation of said means, and a safety device for positively holding the scraper out of engagement with the roll when the mill is out of operation, said safety device having in association therewith, a switch connected in the solenoid circuit and which is moved to circuit closing position when the safety device is rendered inoperative and to circuit opening position when the safety device is rendered operative.

5. A control system according to claim 2, wherein the solenoid circuit includes two parallel paths, one path including a circuit opening and closing device controlled by timing the mechanism, and the other path a second circuit opening and closing device controlled according to the position of the carriage, and means operable when the carriage is in one position to close the second circuit device and render the timing mechanism inoperative so as to open the circuit device controlled by the timing mechanism, and said means being operable when the circuit is in another position to open the second mentioned circuit device and render the timing mechanism operative so that the circuit device controlled by the timing mechanism is subsequently closed thereby.

BARTHOLD DE MATTIA.